United States Patent Office.

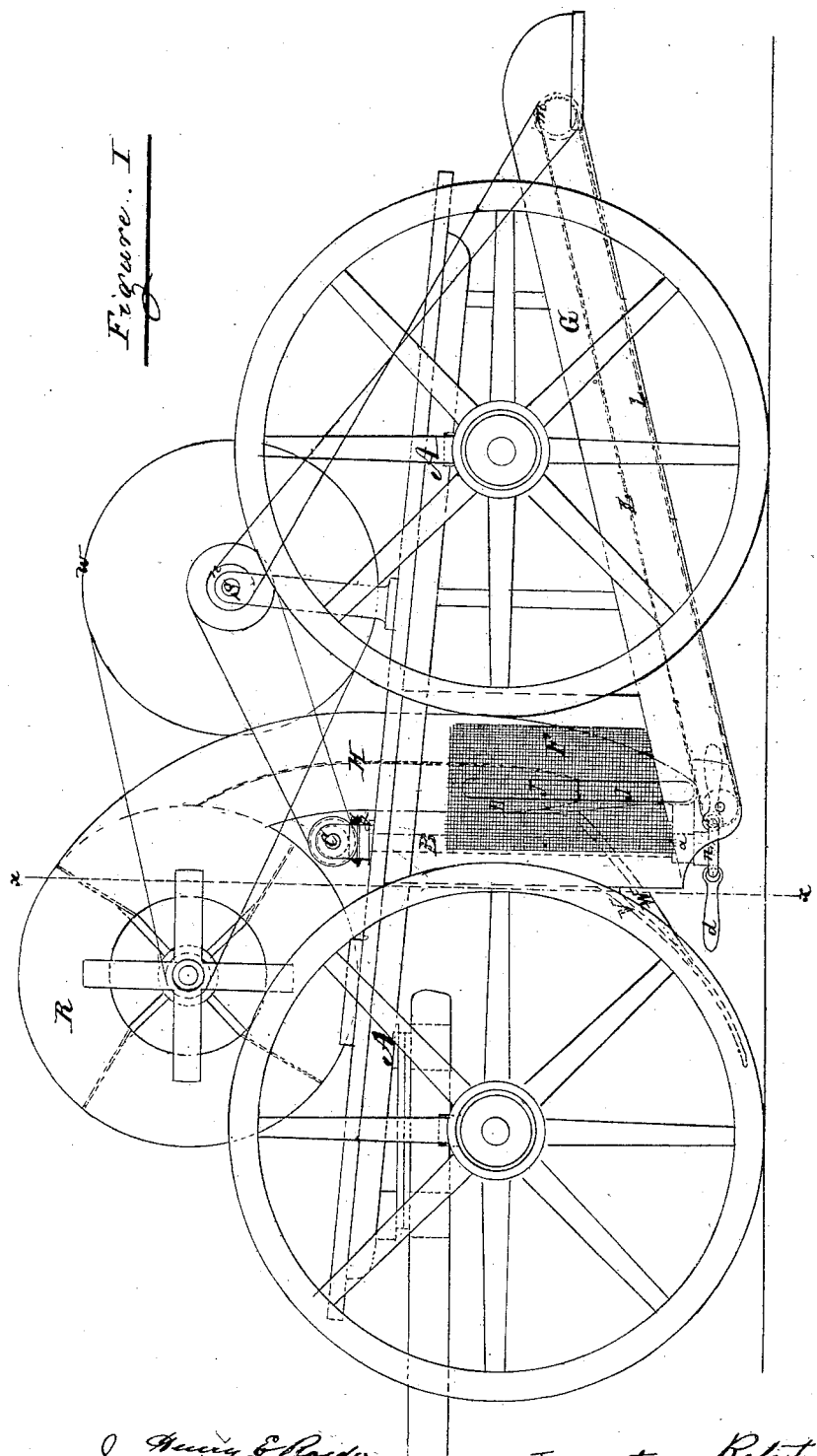

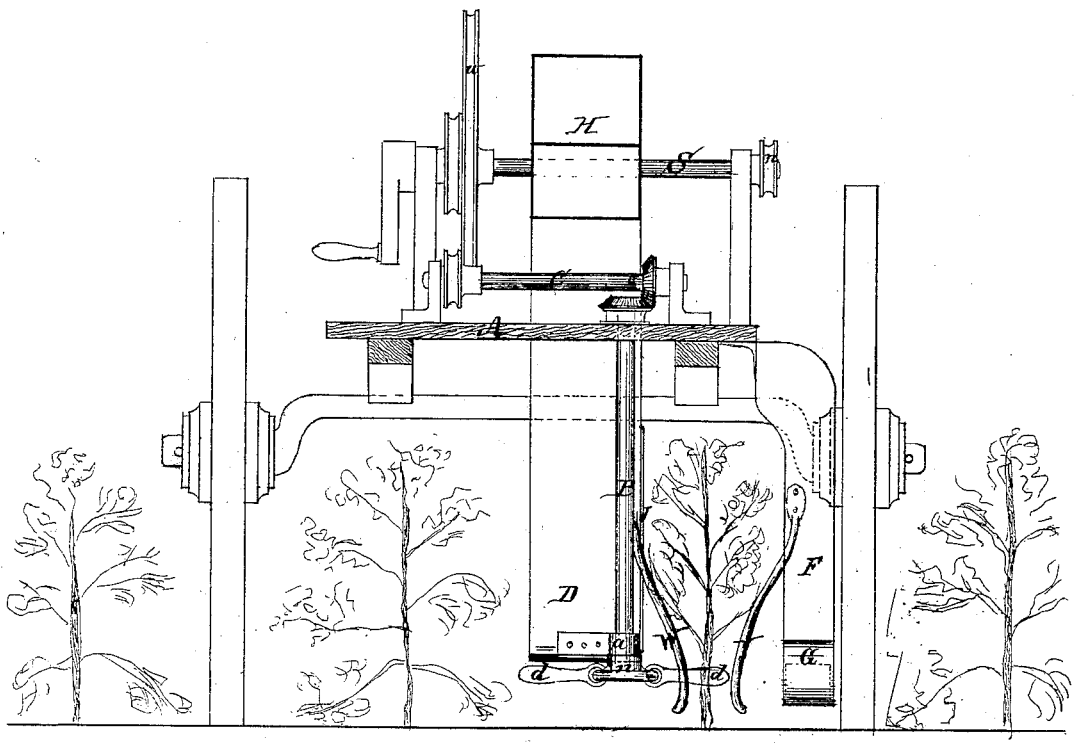

ROBERT F. COOKE, OF NEWARK, NEW JERSEY.

Letters Patent No. 78,362, dated May 26, 1868.

---

IMPROVEMENT IN COTTON-PICKER.

---

The Schedule referred to in these Letters Patent and making part of the same.

---

TO ALL WHOM IT MAY CONCERN:

Be it known that I, ROBERT F. COOKE, of Newark, county of Essex, and State of New Jersey, have invented a new and improved "Cotton-Picker;" and I do hereby declare that the following is a full and exact description of the same, reference being had to the accompanying drawings, where—

Sheet I represents a longitudinal elevation of the machine, and

Sheet II shows a cross-section of the same, at the line $x\,x$ in drawing on Sheet I.

The nature of this invention consists in the arrangement of a shaking-device, operating against the lower part of the stem of the cotton-plant in such a manner as to open thereby the cotton-bolls, and allow the cotton to separate itself from the boll. And, further, in the combination with said shaking-device, the arrangement of a blast or current of air extending nearly the whole height of the plant, and whereby the cotton, after being separated or detached from its boll, is blown or carried into a suitable receptacle.

For this purpose I construct a wagon, A, of sufficient height, below the under side of its axles, as to allow the same to pass over the top of the cotton-plant, and of such a width as to straddle two rows of cotton-plants, as shown in Fig. II.

To the under side of this wagon I fasten and arrange the shaking-device, which may be constructed in various ways, of which I prefer the following, and which consists of an upright shaft, B, turning freely on the top in a suitable bearing fast to the top of the wagon, and at or near its bottom in a bearing, $a$, attached to the lower end of the blast-pipe D. Below this bearing, $a$, a flanch, $n$, is securely fastened to the shaft B, to which said flanch three or more flails, $d$, are attached. The upper end of this shaft B is connected by suitable gearing, $e$, with a horizontal shaft, C, and receives, through the same, the desired rotary motion, the shaft C itself receiving its motion from the main driving-shaft S, supported on the top of the wagon.

These flails $d$ are made of such a length as to reach the stem of the cotton-plant while the wagon is passing, and as the centrifugal force when the shaft B is rotating will always throw the flails outwards, they will strike the stem the desired blow, giving it the desired shaking-motion to open the ripe bolls, and cause the cotton to separate from the bolls.

Close behind this shaking-apparatus the blast-pipe D is arranged, provided with a long opening, J, extending the whole height of the cotton-plant. The cotton, after being separated from its boll by the above-described shaking-device, comes almost immediately before this blast-opening J through the forward motion of the wagon, and is then blown or carried by this blast into a suitable receiver, F, between which and the blast-pipe the cotton-plant is made to pass. This receiver, F, is attached to the side of the wagon in such a position as to come directly opposite the long blast-opening J. The back of this receiver is made of wire-work, or perforated, as shown in blue lines in Fig. I, to allow the air to escape freely, and to retain the cotton blown into the same. On the bottom of this receiver, F, a trough, G, is attached, leading to the after end of the wagon, containing an endless belt or conveyer, L, to convey the cotton from the receiver F to the end of this conveyer or trough, where a bag or any other suitable receptacle may be attached.

The axle of the pulley $m$, in the farther end of the trough, over which the belt L runs, is provided with a pulley, and receives its motion through a strap from the pulley $u$ on the driving-shaft S.

On the top of the wagon A one or two blowers, R, are arranged, worked from the pulley $w$ on the main driving-shaft S, or by any other suitable arrangement.

If only one blower is used, I prefer to divide the discharge-pipe, so as to deliver one-half of the blast in the upper part of the long opening J, and the remaining into the lower part, for the purpose of equalizing the blast of air throughout the whole length of this opening J. Or the discharge-pipe H of the blower may be divided in three or more channels.

The object of making the blast-opening J nearly the whole length of the cotton-plant, is to insure the blast meeting the cotton as the same falls out of its boll, in consequence of the shaking, at whatever height the same may be on the plant, for the purpose of carrying or blowing the cotton into the receiver, as above described.

On the receiver F, as well as on the blast-pipe D, guides, V W, are attached, projecting some considerable distance forward of the shaking-device. These guides are bent towards the centre, between the receiver F and blast-pipe D, and, at the same time, downwards, and are for the purpose of lifting up the lower branches of the cotton-plant, which generally lie on the ground, and bend the same upwards, as well as to bend the other branches of the plant inwards, and to guide the same into the space between the receiver and blast-pipe, to be acted upon by the shaking-device and by the blast, in the manner set forth.

Instead of attaching these guides in the manner above specified, the same may be fastened to any part of the wagon, and combined with suitable guide-frames or plates, to cause the plant to come in proper position to be acted upon by the shaking-device and then by the blast.

What I claim as my invention, and desire to secure by Letters Patent, is—

1. Opening the bolls of cotton-plants and disengaging the cotton from the bolls by means of knocking or shaking the cotton-plant, as set forth and specified.

2. I claim the arrangement of flails $d$ at the lower end of a revolving shaft operating the cotton-plant, in the manner and for the purpose substantially as set forth.

3. I claim, in combination with a shaking-device which loosens the cotton from the boll, the use of a blast of air to blow the thus loosened cotton into a receiver, substantially as described.

4. I claim the blast-opening J, in combination with the screen or receiver F, said opening and receiver extending nearly from the top to the bottom of the cotton-plant, in the manner and for the purpose set forth.

5. I claim the trough G, provided with an endless-conveyer belt, L, to convey the cotton from the receiver F to the after part, or to any other desired part of the machine, constructed and operated substantially as set forth.

6. I claim the guides V and W, or their equivalent, arranged and constructed so as to lift up the lower branches of the cotton-plant, and to guide the plant, in the manner and for the purpose substantially as set forth and described.

ROBERT F. COOKE.

Witnesses:
 HENRY E. ROEDER,
 WM. DERFER.